US012740500B2

(12) United States Patent
Ross et al.

(10) Patent No.: US 12,740,500 B2
(45) Date of Patent: Sep. 22, 2026

(54) GENERATION AND APPLICATION OF MASKS FOR FARMING IMPLEMENTS OF AUTONOMOUS VEHICLES

(71) Applicant: Deere & Company, Moline, IL (US)

(72) Inventors: Charles McCauley Ross, Los Altos, CA (US); Jacob H. Goldstein, Sunnyvale, CA (US); Michael Albert Elcano, Bakersfield, CA (US); Riley John Sleichter, Johnston, IA (US); Pooja Piyush Mehta, San Jose, CA (US); Florin Cutu, San Jose, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/792,417

(22) Filed: Aug. 1, 2024

(65) Prior Publication Data

US 2025/0248325 A1 Aug. 7, 2025

Related U.S. Application Data

(60) Provisional application No. 63/548,777, filed on Feb. 1, 2024.

(51) Int. Cl.
*A01B 79/00* (2006.01)
*A01B 79/02* (2006.01)

(52) U.S. Cl.
CPC ............ *A01B 79/005* (2013.01); *A01B 79/02* (2013.01)

(58) Field of Classification Search
CPC .... A01B 79/005; A01B 79/02; G06V 10/273; G06V 20/188
USPC ............................................................ 701/28
See application file for complete search history.

(56) References Cited

U.S. PATENT DOCUMENTS

2022/0197291 A1* 6/2022 Liu ...................... G05D 1/0278
2023/0230202 A1* 7/2023 Eichhorn .................. G06T 5/77
345/629

OTHER PUBLICATIONS

Extended European Search Report and Written Opinion issued in European Patent Application No. 25153715.5 dated Apr. 17, 2025, in 09 pages.
Extended European Search Report and Written Opinion issued in European Patent Application No. 25193482.4 dated Nov. 17, 2025, in 13 pages.

(Continued)

*Primary Examiner* — Muhammad Shafi
(74) *Attorney, Agent, or Firm* — Fenwick & West LLP

(57) ABSTRACT

A control system accesses a first set of images corresponding to the farming implement of the autonomous vehicle. Each image in the first set of images comprises pixels of the farming implement and a surrounding environment. The control system generates a pixel mask for the farming implement based on the first set of images, the pixel mask configured to ignore pixels of the farming implement in images to which the pixel mask is applied. The control system accesses a second set of images corresponding to the farming implement and surrounding environment. The control system generates a masked set of images from the second set of images by applying the pixel mask to the second set of images to ignore the pixels of the farming implement in the second set of images. The control system performs a farming action based on the masked set of images, using the autonomous vehicle.

20 Claims, 7 Drawing Sheets

(56) References Cited

OTHER PUBLICATIONS

Extended European Search Report and Written Opinion issued in European Patent Application No. 25193482.4 dated Feb. 9, 2026, in 11 pages.

Australian Search Report issued in application No. 2025210852 dated May 14, 2026, 03 pages.

Australian Patent Office, Search Report, Australian Patent Application No. 2025210852, May 14, 2026, three pages.

* cited by examiner

GENERATION AND APPLICATION OF MASKS FOR FARMING IMPLEMENTS OF AUTONOMOUS VEHICLES

CROSS REFERENCE TO RELATED APPLICATIONS

This application claims the benefit of U.S. Provisional Application No. 63/548,777, filed Feb. 1, 2024, which is incorporated by reference in its entirety.

TECHNICAL FIELD

This disclosure relates generally to operations of an autonomous farming machine and more specifically to generating pixel masks for images of a farming implement.

BACKGROUND

Farming machines are typically used to perform farming actions in a field, such as tilling, planting, and applying a treatment (e.g., watering, fertilizing). Farming machines perform farming actions using attached farming implements that may be pushed ahead or towed behind the body of the farming machine (e.g., planters, grain carts, sprayers). Farming implements come in a variety of shapes, sizes, and configurations depending on the farming action they perform. Additionally, farming implements may be modified using third-party equipment.

Operation of an autonomous farming machine requires systems that prevent the farming machine and attached farming implement from coming into contact with obstacles, including humans and other farming machines. In some instances, these systems work by using digital masks to remove the farming implement from sensor images so as to not detect the farming implement itself in the detection of obstacles. These digital masks are typically based on models of the farming implement, such as models received from the implement's manufacturer, if available. Alternatively, systems may generate models of farming implements from scratch using modeling tools such as CAD software and generate digital masks from these models. While these approaches may work well for a limited set of farming implements, they are not easily applicable for all farming implements, or those with modifications. For one, not all manufacturers make models of their equipment available. Also, making models from scratch is time consuming and prone to error. As such, systems and methods for generating digital masks representing the various array of farming machines such that those machines accurately operate in farming environments would be beneficial.

SUMMARY

A control system generates a pixel mask for a farming implement of an autonomous farming machine. A pixel mask is an image mask that isolates a set of pixels from an image. A pixel mask for a farming implement isolates pixels of the farming implement from pixels that do not correspond to the farming implement, such as pixels of the environment surrounding the implement or pixels of the farming machine. The control system may use the pixel mask to remove pixels of the farming implement from images such that the farming implement is not detected as an object in the way of the farming machine. The control system may use the pixel mask to avoid obstacles that the farming implement may encounter as the farming machine performs an autonomous routine.

In some embodiments, the control system accesses a first set of images corresponding to the farming implement of the autonomous vehicle. Each image in the first set of images comprises pixels of the farming implement and a surrounding environment. The control system generates a pixel mask for the farming implement based on the first set of images, the pixel mask configured to ignore pixels of the farming implement in images to which the pixel mask is applied. The control system accesses a second set of images corresponding to the farming implement and surrounding environment. The control system generates a masked set of images from the second set of images by applying the pixel mask to the second set of images to ignore the pixels of the farming implement in the second set of images. The control system performs a farming action based on the masked set of images, using the autonomous vehicle.

In some embodiments, the control system validates the pixel mask. The control system accesses the pixel mask for the farming implement of the autonomous vehicle and accesses a set of images corresponding to the farming implement. Each image in the set of images comprises pixels of the farming implement and a surrounding environment. The control system generates a masked set of images from the set of images by applying the pixel mask to the set of images to ignore the pixels of the farming implement. The control system determines whether the pixel mask is a valid pixel mask or an invalid pixel mask based on the set of images. Responsive to determining whether the pixel mask is a valid pixel mask or an invalid pixel mask, the control system performs a first farming action if the pixel mask is the valid pixel mask and performs a second farming action different from the first farming action if the pixel mask is the invalid pixel mask.

Figure 1:
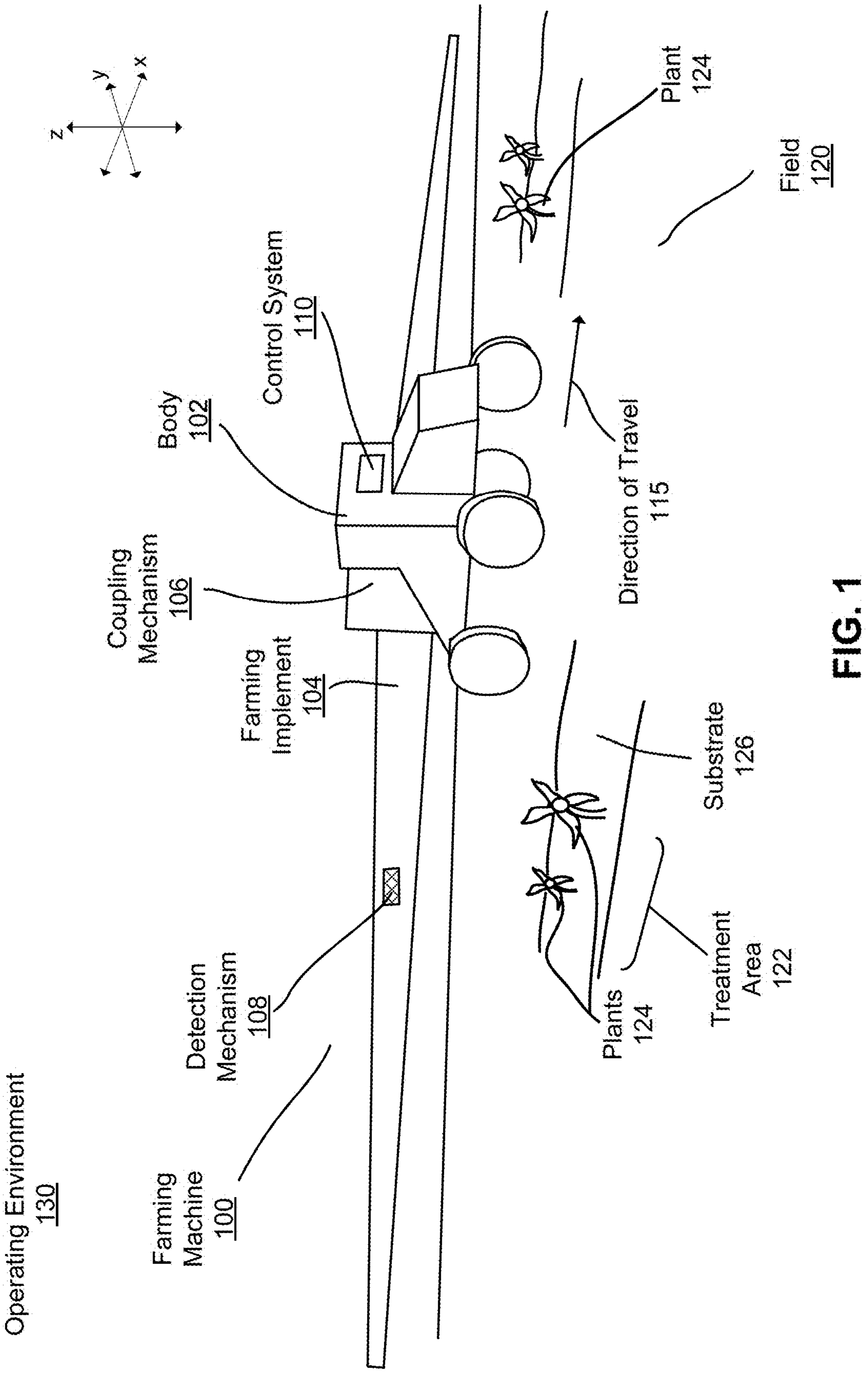
FIG. 1 is a block diagram of a system environment in which autonomous farming machines operate, in accordance with at least one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., tilling the field, planting the field, fertilizing the plants 124, watering the plants 124, weeding the field, harvesting the plants 124, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

II. Farming Machine

Overview

A farming machine that implements farming actions of a treatment plan may have a variety of configurations, some of which are described in greater detail below.

FIG. 1 is an isometric view of a farming machine 100 that performs farming actions of a treatment plan, according to one example embodiment. The farming machine 100 is configured to perform farming actions of a treatment plan in a field 120. To illustrate, the farming machine 100 implements a farming action which applies a treatment to a treatment area 122 within a geographic area of the field 120. The treatment area 122 may contain one or more plants 124 and/or the substrate 126. For example, one farming action may be to till the substrate 126 and another farming action may be to fertilize the plants 124. The farming machine 100 may apply treatments directly to a single plant 124, directly to multiple plants 124, indirectly to one or more plants 124, to the environment associated with the plant 124 (e.g., the substrate 126, soil, atmosphere, or other suitable portion of the plant's environment adjacent to or connected by an environmental factors, such as wind), or otherwise.

The farming machine 100 operates in an operating environment 110 and includes a body 102, an implement 104, a coupling mechanism 106, a detection mechanism 108, and a control system 110. The described components and functions of the farming machine 100 are just examples, and a farming machine 100 can have different or additional components and functions other than those described below.

Operating Environment 110

The farming machine 100 operates in an operating environment 110. The operating environment 110 is the environment surrounding the farming machine 100 while it implements farming actions of a treatment plan. The operating environment 110 may also include the farming machine 100 and its corresponding components. The operating environment 110 typically includes a field 120, and the farming machine 100 generally implements farming actions of the treatment plan in the field 120. A field 120 is a geographic area where the farming machine 100 implements a treatment plan. The field 120 may be an outdoor plant field but could also be an indoor location that houses plants such as, e.g., a greenhouse, a laboratory, a grow house, a set of containers, or any other suitable environment.

A field 120 may include any number of field portions. A field portion is a subunit of a field 120. For example, a field portion may be a portion of the field 120 small enough to include a single plant 124, large enough to include many plants 124, or some other size. The farming machine 100 can execute different farming actions for different field portions. For example, the farming machine 100 may apply an herbicide for some field portions in the field 120, while applying a pesticide in another field portion. Moreover, a field 120 and a field portion are largely interchangeable in the context of the methods and systems described herein. That is, treatment plans and their corresponding farming actions may be applied to an entire field 120 or a field portion depending on the circumstances at play.

The operating environment 110 may also include plants 124. As such, farming actions the farming machine 100 implements as part of a treatment plan may be applied to plants 124 in the field 120. The plants 124 can be crops but could also be weeds or any other suitable plant 124. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 124 may include a stem that is arranged superior to (e.g., above) the substrate 126 and a root system joined to the stem that is located inferior to the plane of the substrate 126 (e.g., below ground). The stem may support any branches, leaves, and/or fruits. The plant 124 can have a single stem, leaf, or fruit, multiple stems, leaves, or fruits, or any number of stems, leaves or fruits. The root system may be a tap root system or fibrous root system, and the root system may support the plant 124 position and absorb nutrients and water from the substrate 126. In various examples, the plant 124 may be a vascular plant 124, non-vascular plant 124, ligneous plant 124, herbaceous plant 124, or be any suitable type of plant 124.

Plants 124 in a field 120 may be grown in one or more plant 124 rows (e.g., plant 124 beds). The plant 124 rows are typically parallel to one another but do not have to be. Each plant 124 row is generally spaced between 2 inches and 45 inches apart when measured in a perpendicular direction from an axis representing the plant 124 row. Plant 124 rows can have wider or narrower spacings or could have variable spacing between multiple rows (e.g., a spacing of 12 in. between a first and a second row, a spacing of 16 in. a second and a third row, etc.).

Plants 124 within a field 120 may include the same type of crop (e.g., same genus, same species, etc.). For example, each field portion in a field 120 may include corn crops. However, the plants 124 within each field 120 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 124 and a grass weed.

The operating environment 110 may also include a substrate 126. As such, farming actions the farming machine 100 implements as part of a treatment plan may be applied to the substrate 126. The substrate 126 may be soil but can alternatively be a sponge or any other suitable substrate 126. The substrate 126 may include plants 124 or may not include plants 124 depending on its location in the field 120. For example, a portion of the substrate 126 may include a row of crops, while another portion of the substrate 126 between crop rows includes no plants 124.

Detection Mechanism(s)

The farming machine 100 may include one or more detection mechanisms 108. A detection mechanism 108 may obtain information describing the farming machine 100, the farming implement, or the environment 102 surrounding the farming machine 100. The detection mechanism 108 may use the obtained information to aid in determining and implementing farming actions. For example, the detection mechanism 108 may identify objects (e.g., plants 124, substrate 126, persons, obstacles etc.) in the operating environment 110 of the farming machine 100 based on images of the operating environment 110. For instance, the farming machine 100 may execute one or more detection algorithms (e.g., classifiers based on neural networks, etc.) to identify various features in the environment 102. The farming machine 100 may implement farming actions based on the identified objects, for example planning a path to avoid obstacles or planning a path to target plants 124. Obstacles may include humans, other farming machines, plants, fences, poles, water features, changes in terrain, or other types of obstacles.

The detection mechanism 108 may include one or more sensors. For example, the detection mechanism 108 can include a multispectral camera, a stereo camera, a CCD camera, a single lens camera, a CMOS camera, hyperspectral imaging system, LIDAR system (light detection and ranging system), a depth sensor, dynamometer, IR camera, thermal camera, humidity sensor, light sensor, temperature sensor, or any other suitable sensor. The detection mechanism 108 may be a sensor that measures a state of the farming machine 100. For example, the detection mechanism 108 may be a speed sensor, a heat sensor, or some other sensor that can monitor the state of a component of the farming machine 100. The detection mechanism 108 may be a sensor that measures components during implementation of a farming action. For example, the detection mechanism 108 may be a flow rate monitor, a grain harvesting sensor, a mechanical stress sensor etc. The detection mechanism may be a Global Positioning System (GPS) device. The detection mechanism 108 may include an array of sensors. For example, the detection mechanism 108 may include an array of cameras configured to capture an array of pictures representing the environment 102 surrounding the farming machine 100 and a corresponding array of GPS devices tracking the location of each camera as the farming machine 100 moves.

The detection mechanism 108 may be mounted on the body 102 or the implement 104 of the farming machine 100. For example, though the detection mechanism 108 is shown in FIG. 1 as mounted on the farming implement 104, the detection mechanism 108 may be mounted on the body 102 pointed back towards the implement 104. The detection mechanism 108 may be mounted depending on the information the detection mechanism obtains. For example, to obtain information about the state of the farming machine 100, such as the heat of the farming machine 100, the detection mechanism 108 may be mounted on the body of the farming machine 110. As another example, to detect the shape of the implement 104, the detection mechanism 108 may be a camera mounted on the body of the farming machine 100. Depending on where the detection mechanism 108 is mounted relative to the implement 104, one or the other may pass over a geographic area in the field 120 before the other. For example, the detection mechanism 108 may be positioned on the body 102 of the farming machine 100 such that it traverses over a geographic location before the implement 104 as the farming machine 100 moves through the field 120. In another examples, the detection mechanism 108 is positioned on the implement 104 such that the two traverse over a geographic location at substantially the same time as the farming machine 100 moves through the filed. The detection mechanism 108 may be statically mounted to the body 102 or implement 104, or may be removably or dynamically coupled to the body 102 or implement 104. In other examples, the detection mechanism 108 may be mounted to some other surface of the farming machine 100 or may be incorporated into another component of the farming machine 100.

Farming Implement(s)

The farming machine 100 may include a farming implement 104. The farming implement 104 can implement farming actions in the operating environment 110 of a farming machine 100. For instance, a farming machine 100 may include a farming implement 104 that applies a treatment to a plant 124, a substrate 126, or some other object in the operating environment 110. More generally, the farming machine 100 uses the farming implement 104 to apply a treatment to a treatment area 122, and the treatment area 122 may include anything within the operating environment 110 (e.g., a plant 124 or the substrate 126). In other words, the treatment area 122 may be any portion of the operating environment 110.

When the treatment is a plant treatment, the farming implement 104 applies a treatment to a plant 124 in the field 120. The farming implement 104 may apply treatments to identified plants or non-identified plants. For example, the farming machine 100 may identify and treat a specific plant (e.g., plant 124) in the field 120. Alternatively, or additionally, the farming machine 100 may identify some other trigger that indicates a plant treatment and the farming implement 104 may apply a plant treatment. The farming implement 104 may include one or more spray nozzles, one or more electromagnetic energy sources (e.g., a laser), one or more physical implements configured to manipulate plants, or other mechanisms for applying treatments to plants.

Additionally, when the treatment is a plant treatment, the effect of treating a plant 124 with a farming implement 104 may include any of plant necrosis, plant growth stimulation, plant portion necrosis or removal, plant portion growth stimulation, or any other suitable treatment effect. Moreover, the farming implement 104 can apply a treatment that dislodges a plant 124 from the substrate 126, severs a plant 124 or portion of a plant 124 (e.g., cutting), incinerates a plant 124 or portion of a plant 124, electrically stimulates a plant 124 or portion of a plant 124, fertilizes or promotes growth (e.g., with a growth hormone) of a plant 124, waters a plant 124, applies light or some other radiation to a plant 124, and/or injects one or more working fluids into the substrate 126 adjacent to a plant 124 (e.g., within a threshold distance from the plant). Other plant treatments are also possible. When applying a plant treatment, a farming implement 104 may be configured to spray one or more of: an herbicide, a fungicide, insecticide, some other pesticide, or water.

When the treatment is a substrate treatment, the farming implement 104 applies a treatment to some portion of the substrate 126 in the field 120. The farming implement 104 may apply treatments to identified areas of the substrate 126, or non-identified areas of the substrate 126. For example, the farming machine 100 may identify and treat an area of substrate 126 in the field 120. Alternatively, or additionally, the farming machine 100 may identify some other trigger that indicates a substrate 126 treatment and the farming implement 104 may apply a treatment to the substrate 126. The farming implement 104 may include one or more spray nozzles, one or more electromagnetic energy sources (e.g., a laser), one or more physical implements configured to manipulate (e.g., till) the substrate 126, or other mechanisms for applying treatments to the substrate.

The farming machine 100 is not limited to farming implements 104 for plants 124 and substrates 126. The farming machine 100 may include treatment mechanisms 120 for applying various other treatments to objects in the field 120. The farming implement 104 may perform multiple treatments, for example watering the substrate while tilling the substrate.

The farming implement 104 may be operable between a standby mode and a treatment mode. In the standby mode the farming implement 104 does not apply a treatment, and in the treatment mode the farming implement is controlled by the control system 110 to apply the treatment. However, the treatment mechanism 120 can be operable in any other suitable number of operation modes.

The farming implement 104 may be attached to the farming machine 100 via the coupling mechanism 106. To provide some contextual examples, the farming implement may be any of a plow, harrow, cultivator, seeder/planter, fertilizer spreader, sprayer, mower, baler, tillage equipment, wagon/trailer, spreader, rotary tiller, forage harvester, grain cart. Each of the implements are configured to enable the farming machine 100 to perform different farming actions, and may performing different farming actions themselves. The farming implement 104 may be modified to perform different or additional farming actions. For example, a sprayer may be modified to include an object identification system to identify plants to spray. Similarly, a farming implement that performs multiple farming actions may be modified to perform fewer farming actions. For example, a farming implement that performs tilling and watering actions waters may be modified to perform just a tilling action or perform just a watering action. In some embodiments, the farming implement may be modified with the addition of third-party equipment. Each of the farming implements may have different form factors, and modifications to the farming implements introduce further variation in form factors. The farming machine 100 accounts for differences in form factors in different manners, as described hereinbelow.

The farming implement 104 may movable (e.g., translatable, rotatable, etc.) on the farming machine 100 or actuatable to align the farming implement 104 to a treatment area 122. In some configurations, the farming machine 100 may align the farming implement 104 or a component of the farming implement 104 with an identified object in the operating environment 110.

Coupling Mechanism(s)

The coupling mechanism 106 functions to removably or statically couple various components of the farming machine 100. For example, the coupling mechanism 106 may be a hitch that couples the implement 104 to the body 102. The coupling mechanism may couple one or more implements 104 to the farming machine 100.

Control System(s)

The control system 110 controls operation of the various components and systems on the farming machine 100. For instance, the control system 110 can obtain information about the operating environment 110, process that information to identify a farming action, and implement the identified farming action with system components of the farming machine 100. The control system 110 can receive information from any component or system of the farming machine 100. For example, the control system 110 may receive sensor data from the detection mechanism 108.

The control system 110 can provide input to the components of the farming machine 100. For instance, the control system 110 may be configured to input and control operating parameters of the farming machine 100 (e.g., speed, direction). Similarly, the control system 110 may be configured to input and control operating parameters of the detection mechanism 108. Operating parameters of the detection mechanism 108 may include processing time, location and/or angle of the detection mechanism 108, image capture intervals, image capture settings, etc. Finally, the control system 110 may be configured to generate machine inputs for farming implement 104. That is, the control system 110 may translate a farming action of a treatment plan into machine instructions implementable by the farming implement 104.

The control system 110 can be operated by a user operating the farming machine 100, wholly or partially autonomously, operated by a user connected to the farming machine 100 by a network, or any combination of the above. For instance, the control system 110 may be operated by an agricultural manager sitting in a cabin of the farming machine 100, or the control system 110 may be operated by an agricultural manager connected to the control system 110 via a wireless network. In another example, the control system 110 may implement an array of control algorithms, machine vision algorithms, decision algorithms, etc. that allow the farming machine 100 to operate autonomously or partially autonomously.

The control system 110 may be implemented by a computer or a system of distributed computers. The computers may be connected in various network environments. For example, the control system 110 may be a series of computers implemented on the farming machine 100 and connected by a local area network. In another example, the control system 110 may be a series of computers implemented on the farming machine 100, in the cloud, a client device and connected by a wireless area network.

The control system 110 can apply one or more computer models to determine and implement farming actions in the field 120. For example, the control system 110 can apply a plant identification module to images acquired by the detection mechanism 108 to determine and implement farming actions.

In some configurations, the farming machine 100 may additionally include a communication apparatus, which functions to communicate (e.g., send and/or receive) data between the control system 110 and a set of remote devices. The communication apparatus can be a Wi-Fi communication system, a cellular communication system, a short-range communication system (e.g., Bluetooth, NFC, etc.), or any other suitable communication system.

Other Machine Components

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 110. For instance, the farming machine 100 may include a drive train for rotating wheels or treads. In different configurations, the farming machine 100 may include any other suitable number or combination of locomoting mechanisms and drive mechanisms.

The farming machine 100 may additionally include a power source, which functions to power the system components, including the detection mechanism 108, control system 110, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III. System Environment

Figure 2:
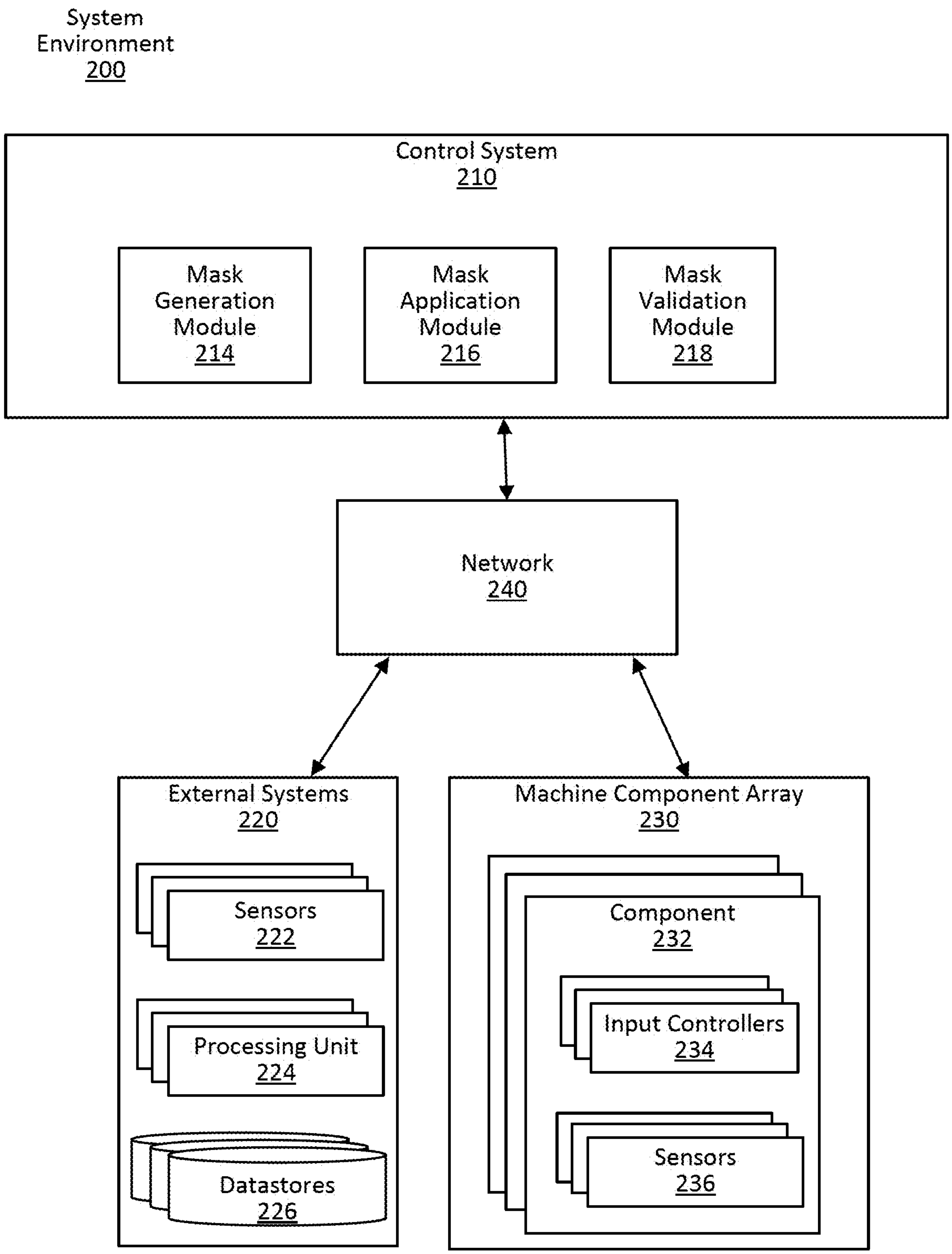
FIG. 2 is a block diagram of an autonomous farming machine of FIG. 1, in accordance with at least one embodiment.

FIG. 2 is a block diagram of the system environment for the farming machine 100, in accordance with one or more example embodiments. In this example, the system environment 200 includes a control system 210 (e.g., the control system 110), external systems 220, and a machine component array 230 connected via a network 240.

The external systems 220 are any system that can generate data representing information useful for determining and implementing farming actions in a field. External systems 220 may include one or more sensors 222, one or more processing units 224, and one or more datastores 226.

The one or more sensors 222 can measure the field 120, the operating environment 130, the farming machine 100, etc. and generate data representing those measurements. For instance, the sensors 222 may include a rainfall sensor, a wind sensor, heat sensor, a camera, etc. The sensors 222 may be located on the farming machine, the farming implement or elsewhere within the surrounding environment. The sensors 222 may be sensors of the detection mechanism 108.

The processing units 224 may process measured data to provide additional information that may aid in determining and implementing farming actions in the field. For instance, a processing unit 224 may access an image of a field 120 and calculate a weed pressure from the image or may access historical weather information for a field 120 to generate a forecast for the field. The processing unit 224 may process measured data and send the processed data to the control system 210 for generating, applying, and validating pixel masks. For example, the processing unit 224 may isolate pixels of a farming implement from an image and send the isolated pixels to the control system 210 to use in generating a pixel mask for the farming implement.

The datastores 226 store information regarding the farming machine 100, the operating environment 130, the field 120, etc. that may be beneficial in determining and implementing farming actions in the field. For instance, the datastore 226 may store results of previously implemented treatment plans and farming actions for a field 120, a nearby field, and or the region. The historical information may have been obtained from one or more farming machines (i.e., measuring the result of a farming action from a first farming machine with the sensors of a second farming machine). Further, the datastore 226 may store results of specific faming actions in the field 120, or results of farming actions taken in nearby fields having similar characteristics. The datastore 226 may store historical weather, flooding, field use, planted crops, etc. for the field and the surrounding area. Finally, the datastores 226 may store any information measured by other components in the system environment 200. For example, the datastore may store sensor data from the sensors 222, such as storing images from a camera sensor.

The machine component array 230 includes one or more components 232. Components 232 are elements of the farming machine 100 that can receive and implement farming actions (e.g., a farming implement 104). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 130 and provides that data to other systems and components within the system environment 200. The measurements may be of a component 232, the farming machine 100, the operating environment 130, etc. For example, a sensor 222 may measure a configuration or state of the component 232 (e.g., a setting, parameter, power load, etc.), measure conditions in the operating environment 130 (e.g., moisture, temperature, etc.), capture information representing the operating environment 130 (e.g., images, depth information, distance information), and generate data representing the measurement(s).

The control system 210 (e.g., the control system 110) receives information from external systems 220 and the machine component array 220 and implements a treatment plan in a field with a farming machine. The control system 210 includes a mask generation module 214, a mask application module 216, and a mask validation module 218.

The mask generation module 214 generates pixel masks for farming implements of the farming machine. A pixel mask is an image mask that isolates a set of pixels from an image. A pixel mask for a farming implement isolates pixels of the farming implement from pixels that do not correspond to the farming implement, such as pixels of the environment surrounding the implement or pixels of the farming machine. In some embodiments, the control system 210 uses the pixel mask to remove pixels of the farming implement from images such that the detection mechanism 108 does not detect the farming implement as an object in the images. In doing so, the control system 210 prevents the detection mechanism 108 from implementing a farming action based on the detected object, such as pausing operation of the farming machine or planning a path to avoid the farming implement. In some embodiments, the control system 210 may use the pixel mask to avoid obstacles that the farming implement may encounter as the farming machine performs an autonomous routine.

The mask generation module 214 generates a pixel mask for a farming implement based on a set of images that capture the farming implement and a surrounding environment. The mask generation module 214 may access images captured by sensors 222 (e.g., sensors of the detection mechanism 108). The sensors may capture images from locations on the farming machine, on the farming implement, or elsewhere within the surrounding environment. As such, the accessed images may provide varying views of the farming implement. For example, one image may include a view of the farming implement from the front of the implement, while another image may include a view of the farming implement from the back of the implement. The sensors may capture the images while the farming implement is in a stationary position or while the farming implement is in motion. For example, the sensors may capture the images while the farming implement is attached to the farming machine performing a routine. An example routine may be a drive pattern. In performing a drive pattern routine, the farming machine may follow a predetermined route with predetermined speeds along each portion of the route. The mask generation module 214 may access images stored in a datastore, such as datastore 226, or may access images in real time from the sensors 222 directly. Along with accessing images, the mask generation module 214 may access image metadata, for example times at which images were taken or GPS coordinates of the sensors taking the images.

The mask generation module 214 may utilizes the captured images in a variety of ways to generate a pixel mask, some of which are described hereinbelow.

Implement Segmentation Pixel Masks

The mask generation module 214 segments the farming implement from the raw images. The mask generation module 214 may perform such segmentation using an image segmentation model. Example image segmentation models may include neural network-based models, Bayesian-based models, threshold-based models, or clustering models. The image segmentation model receives an image including the farming implement as input and outputs a segment of the image corresponding to the farming implement. The segment of the image may be represented as a set of pixels.

To illustrate, consider an example where a farming machine captures images of the farming implement as it travels through a field performing farming actions. Each one of the images includes pixels representing the farming implement and pixels representing the environment. The mask generation module 214 segments the image to classify the pixels such as, e.g., implement, substrate, plants, sky, etc. The mask generation module 214 generates a pixel mask using the pixels labeled as implement. The generated pixel mask may be static (e.g., because the implement is in the same position every image) or dynamic (e.g., because the implement is in different positions in every image).

In some embodiments, the mask generation module 214 generates a pixel mask using a calibration routine. In a calibration routine, the farming machine performs a drive pattern. The drive pattern may involve the farming machine following a predetermined route. For example, a drive pattern may have the farming machine follow a figure-8 pattern, a loop around the field, or a straight path. In some embodiments, the farming machine may follow the predetermined route with predetermined speeds along each portion of the route. The sensors 222 may capture a set of images of the farming implement as the farming machine follows the predetermined route. As the farming machine moves along the route, the pixels of the surrounding environment will change between each image, while the pixels corresponding to the farm implement will stay the same. Thus, to generate a pixel mask, the mask generation module 214 identifies pixels in set of images that do not change between the set of images.

Implement Projection Pixel Masks

In some embodiments, the mask generation module 214 generates a pixel mask by projecting the boundary of the farming implement down to a set of GPS locations corresponding to the ground below the farming implement (or a planar representation of the ground below the farming implement made from those GPS locations). The mask generation module 214 identifies the boundary of the image segment corresponding to the farming implement, the boundary made up of a set of pixels. Based on sensor metadata of the sensor that captured the image (e.g., camera field of view, focal length, aperture, GPS location of the sensor, and orientation), the mask generation module 214 projects the boundary down to a set of GPS locations corresponding to the ground below the farming implement. The result of this process is a set of projected pixels, each pixel corresponding to a GPS location (or coordinate) of where the farming implement lies above the ground. The mask generation module 214 may repeat the process for additional images, generating a set of projected pixels for each image. The mask generation module 214 generates the pixel mask based on one or more sets of projected pixels. For example, the mask generation module 214 may generate the pixel mask by averaging the sets of projected pixels. For example, the farming implement may be a tiller that moves through a field performing a tilling action. In each image of the tiller, the mask generation module 214 identifies a boundary of an image segment that correspond to the tiller. The mask generation module projects the boundary of the image segment to a set of GPS locations corresponding to the ground below the farming implement. The projected boundary thus represents the tiller's two-dimensional profile on the ground.

Depth Based Pixel Masks

In some embodiments, the mask generation module 214 generates a pixel mask based on depth measurements from a depth sensor. For each pixel of the farming implement, as given by the image segment, the mask generation module 214 determines a corresponding depth measurement. The mask generation module 214 builds a point cloud representing the farming implement based on the depth measurements for the pixels of the farming implement. The mask generation module 214 may repeat the process for additional images, building point clouds for each image. The mask generation module 214 generates a pixel mask by merging the point clouds. The mask generation module 214 may merge the point clouds by overlaying each of the point clouds using GPS coordinates of the images the point clouds correspond to.

To illustrate, consider an example where the farming implement is a grain cart. For each pixel corresponding to the grain cart in an image of the grain cart, the mask generation module 214 accesses a depth measurement (e.g., captured by a depth sensor). The mask generation module 214 builds a point cloud representing the grain cart based on the depth measurements. The mask generation module 214 may repeat the process for additional images of the grain cart, building multiple point clouds representing the grain cart. The mask generation module 214 may merge the point clouds to generate a pixel mask for the grain cart.

Pixel Masks from Fiducials

In some embodiments, the mask generation module 214 generates a pixel mask based a set of fiducial markers. Fiducial markers are physical identifiers that serve as reference points. Fiducials may be located at the edges of the farming implement, forming a boundary around the implement. Each fiducial marker in the set of fiducial markers may be a unique marker (e.g., QR code) corresponding to an index (e.g., 0, 1, 2, 3). The mask generation module 214 accesses images that include the farming implement with attached fiducial markers. The mask generation module 214 identifies pixels in the image that correspond to the fiducial markers. Based on the identified pixels, the mask generation module 214 generates the pixel mask. For example, the mask generation module 214 map form a boundary between the pixels of the identified mark and use the area inside the boundary as the pixel mask. Further description of this embodiment may be found in reference to U.S. Provisional Application No. 63/548,777, filed Feb. 1, 2024.

As an example, the farming implement may be a tiller. The tiller may include a set of fiducial markers, with each fiducial marker attached at an edge of the tiller. As the farming machine drives, image sensors on the farming machine may capture images of the tiller, each image including the set of fiducial markers. The mask generation module 214 may identify the fiducial markers within the images of the tiller. The mask generation module 214 may use the identified fiducial markers to generate a pixel mask, for example by forming a boundary between the identified fiducial markers and using the area inside the boundary as the pixel mask for the tiller.

Accessed Model Pixel Masks

In some embodiments, a farming implement may have an existing pixel mask associated with it. In these embodiments, the mask generation module 214 may determine that the images in the set of images represent a farming implement associated with an existing pixel mask and access the pixel mask that represents the farming implement. The mask generation module 214 may access existing pixel masks from a database or may receive the existing pixel mask as input from the farming implement or the operator of the autonomous farming machine. For example, a tiller may have an existing pixel mask associated with it. When the tiller is connected to the farming machine, the mask generation module 214 determines that the images in the set of images represent the tiller and receives the pixel mask from the tiller. The farming implement may provide an existing pixel mask along with information about the pixel mask, such as the dimensions of the mask. In some embodiments, the farming implement may have an associated existing model, such as a CAD model of the implement provided by the implement's manufacturer. The mask generation module 214 may access the model associated with the farming implement and use the model to generate a pixel mask for the farming implement.

Mask Application and Validation

The mask application module 216 applies the generated pixel mask to a set of images including the farming implement and surrounding environment. In applying the pixel mask to the images, the mask application module 216 generates a masked set of images. The masked set of images include pixels of the surrounding environment but ignores pixels of the farming implement. The detection mechanism 108 may thus identify objects in the operating environment of the farming machine based on the masked set of images. This prevents the detection mechanism 108 from identifying the farming implement itself as an object, further preventing the detection mechanism from implementing a farming action based on the detected object (e.g., pausing operation of the farming machine or planning a path to avoid the farming implement).

The mask application module 216 may apply the generated pixel mask to images received from sensors 222 (e.g., the detection mechanism 108) as the farming machine performs a farming action. For example, the farming machine may perform a farming action involving tilling a field. As the farming machine tills the field, the sensors 222 capture images of the farming implement and surrounding environment. The mask application module 216 applies the pixel mask to the images captured by the sensors 222. In some embodiments, the sensors 222 may capture the set of images used for generation of the pixel mask in a first pass of a farming action (e.g., tilling) and capture the set of images used for application of the pixel mask in a second pass of the farming action. In other embodiments, the sensors 222 may capture the set of images used for generation and application of the pixel mask in the same pass of a farming action. The set of images used for generation of the pixel mask may be different from the set of images used for application of the pixel mask.

The mask validation module 218 determines whether the pixel mask for the farming implement of the farming machine is a valid or invalid mask. An invalid mask is a mask that does not accurately represent the farming implement. One example of an invalid mask is a mask that does not include all pixels of the farming implement. That is, the mask is too small. If the mask is too small, the detection mechanism 108 may detect a part of the farming implement as an object and cause the farming machine to pause or stop operation. Another example of an invalid mask is a mask that includes pixels of the surrounding environment in addition to pixels of the farming implement. That is, the mask is too large. If the mask is too large, the control system 210 may prevent the farming implement from going as close to objects as it normally would. For example, the control system may prevent the farming implement from approaching the edge of the field, leaving the edge of the field untreated (e.g., untilled, unfertilized, etc.).

In some embodiments, the mask validation module 218 determines whether the pixel mask for the farming implement is a valid or invalid mask by applying the pixel mask to an image and comparing the unmasked image to the masked image. In some embodiments, the mask validation module 218 determines whether the pixel mask is valid or invalid by comparing the pixel mask to a model of the farming implement (e.g., a CAD model). In some embodiments, the mask validation module 218 determines whether the pixel mask is valid or invalid by providing an instruction to a client system to enter the configuration of the implement. The mask validation module 218 may provide a picture of the masked image at a user interface of the client system and ask a user to verify whether the mask is valid or invalid.

In some embodiments, the mask validation module 218 may determine, based on the validity of the pixel mask, the need for an additional sensor. For example, the mask validation module 218 may determine that the pixel mask does not represent a portion of the farming implement that is out of the field of view of the image sensors (that is, the pixel mask is too small). The mask validation module 218 may provide an instruction for a client system to affix an additional sensor to the autonomous farming machine or farming implement. In some embodiments, the mask validation module 218 may determine, based on the generated pixel mask, that the farming implement requires an autonomous operation, such as a pause in operation, a reduction in speed, a change of a turn rate, etc.

Techniques similar to those described with respect to the mask generation module 214 and mask validation module 218 may be applied to entities other than farming implements. For example, the mask generation module 214 may generate a mask for obstacles so the control system 210 can avoid or ignore them. The mask validation module 218 may determine whether masks for obstacles are valid or invalid masks. Example obstacles may include humans, other farming machines, plants, fences, poles, water features, changes in terrain, or other types of obstacles.

The network 240 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

IV. Process Flows

Figure 3:
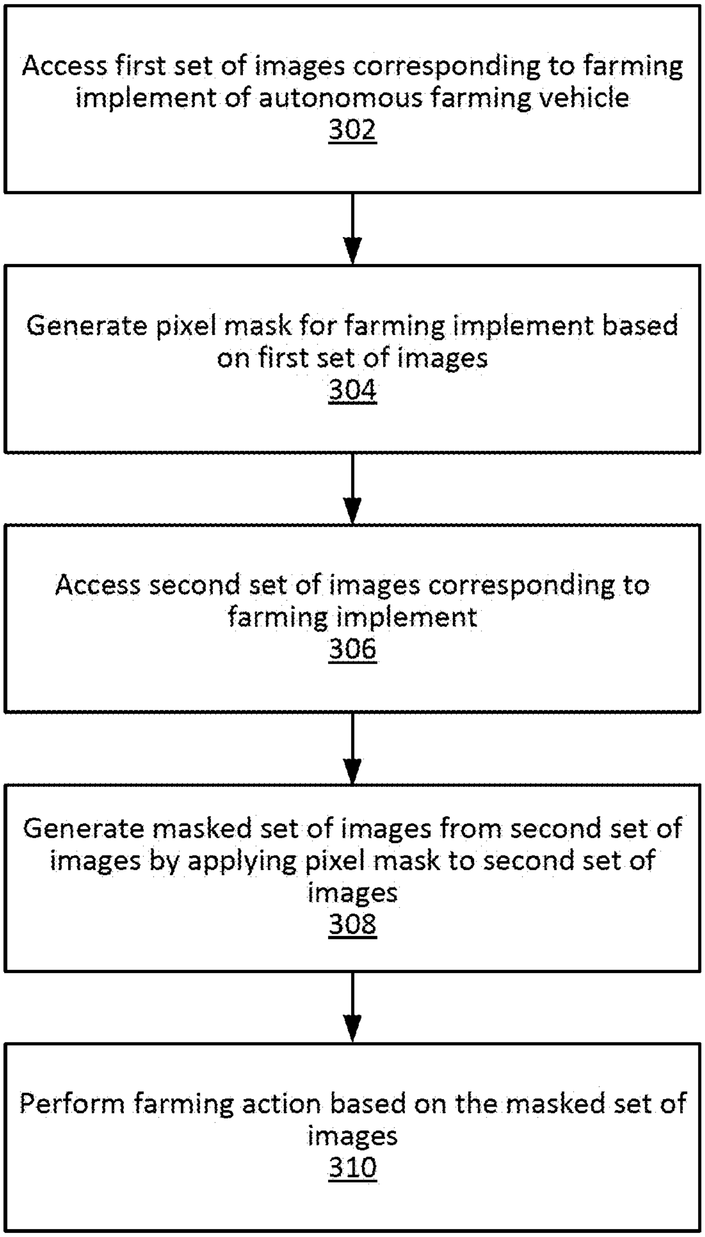
FIG. 3 illustrates a process for generating and applying a pixel mask, in accordance with at least one embodiment.

FIG. 3 illustrates a process for generating and applying a pixel mask, in accordance with at least one embodiment.

The process in FIG. 3 begins with the control system 210 accessing 302 a first set of images corresponding to the farming implement of the autonomous farming machine. The images in the first set of images are captured by sensors 222 from locations on the farming machine, on the farming implement, or elsewhere within the surrounding environment. The sensors 222 may capture the images while the farming implement is in a stationary position or while the farming implement is in motion. Each image in the first set of images includes pixels of the farming implement and a surrounding environment. The control system 210 may access the first set of images from the sensors 222 directly or from datastores 226.

The control system 222 generates 304 (e.g., using the mask generation module 214) a pixel mask for the farming implement based on the first set of images. The pixel mask is configured to ignore pixels of the farming implement in images to which the pixel mask is applied. The control system 222 may generate the pixel mask based on depth measurements from a depth sensor, based a set of fiducial markers, using a calibration routine, or by projecting the boundary of the farming implement down to a set of GPS locations corresponding to the ground below the farming implement.

The control system 210 accesses 306 a second set of images corresponding to the farming implement and the surrounding environment. The second set of images may be different from the first set of images. Similar to the first set of images, the second set of images are captured by sensors 222.

The control system 210 generates 308 (e.g., using the mask application module 216) a masked set of images from the second set of images by applying the pixel mask to the second set of images to ignore the pixels of the farming implement in the second set of images. The control system 210 may apply the generated pixel mask to the second set of images as the farming machine performs a farming action.

The control system 210 performs 310, using the autonomous farming machine, a farming action based on the masked set of images. For example, the control system may perform the action of planting, tilling, or applying a treatment (e.g., fertilizing).

Figure 4:
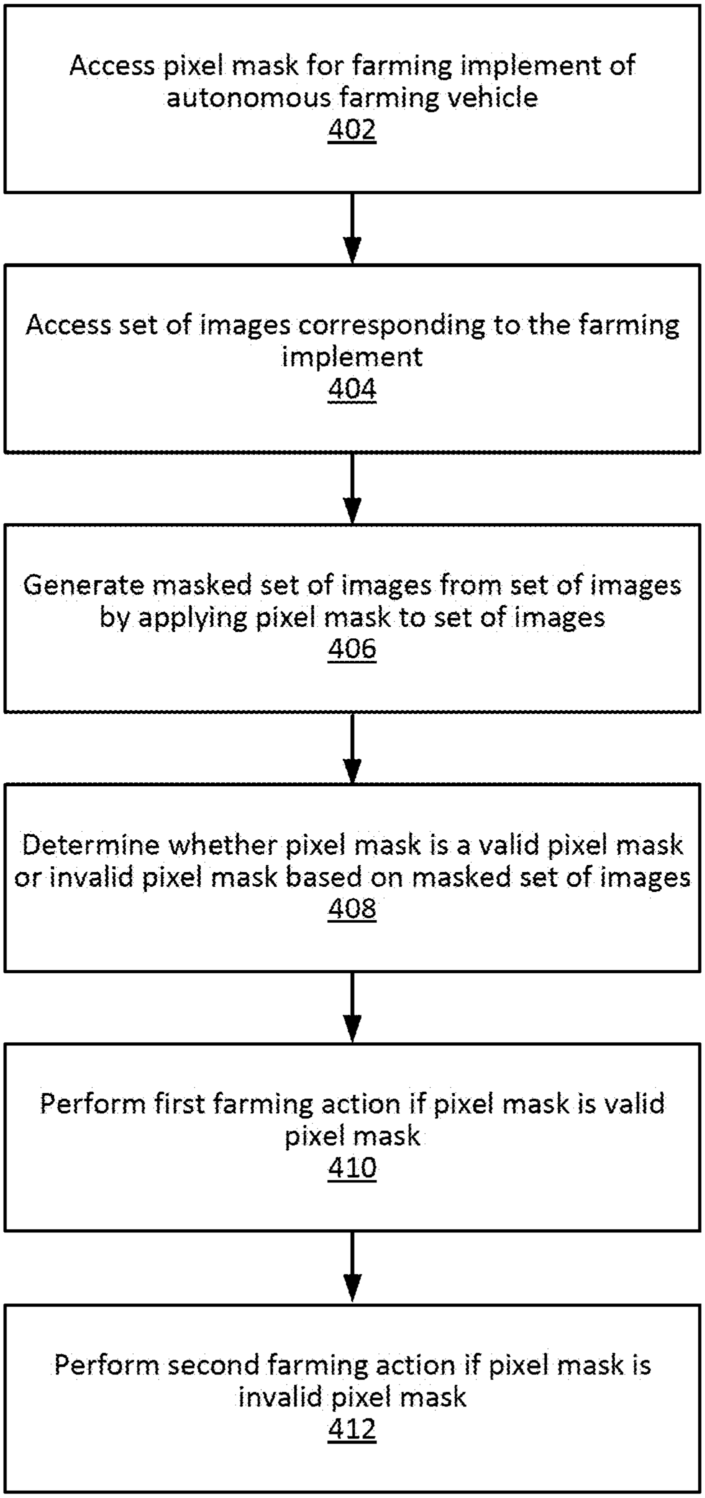
FIG. 4 illustrates a process for validating a pixel mask for a farming implement of an autonomous farming machine, in accordance with at least one embodiment.

FIG. 4 illustrates a process for validating a pixel mask for a farming implement of an autonomous farming machine, in accordance with at least one embodiment.

The process of FIG. 4 begins with the control system 210 accessing 402 the pixel mask for the farming implement of the farming machine and accessing 404 a set of images corresponding to the farming implement. Each image in the set of images comprises pixels of the farming implement and a surrounding environment.

The control system 210 generates 406 (e.g., using the mask application module 216) a masked set of images from the set of images by applying the pixel mask to the set of images to ignore the pixels of the farming implement.

The control system 210 determines 408 (e.g., using the mask validation module 218) whether the pixel mask is a valid pixel mask or an invalid pixel mask based on the set of images.

The control system 210 performs 410 a first farming action if the pixel mask is a valid pixel mask and performs 412 a second farming action if the pixel mask is an invalid pixel mask. The second farming action is different from the first farming action.

V. Example Mask

Figure 5A:
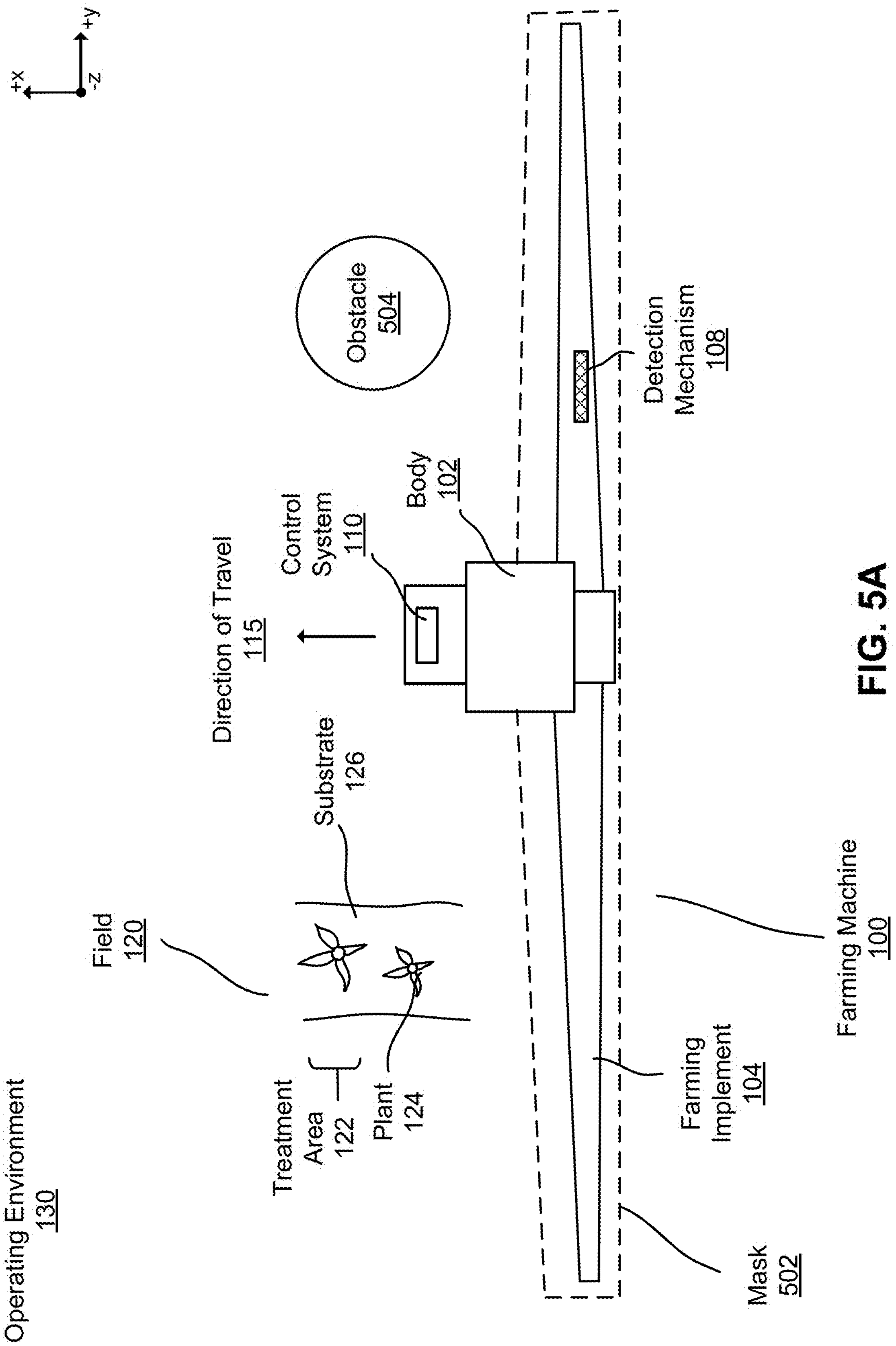
FIG. 5A shows an example mask around a farming implement, in accordance with at least one embodiment.
Figure 5B:
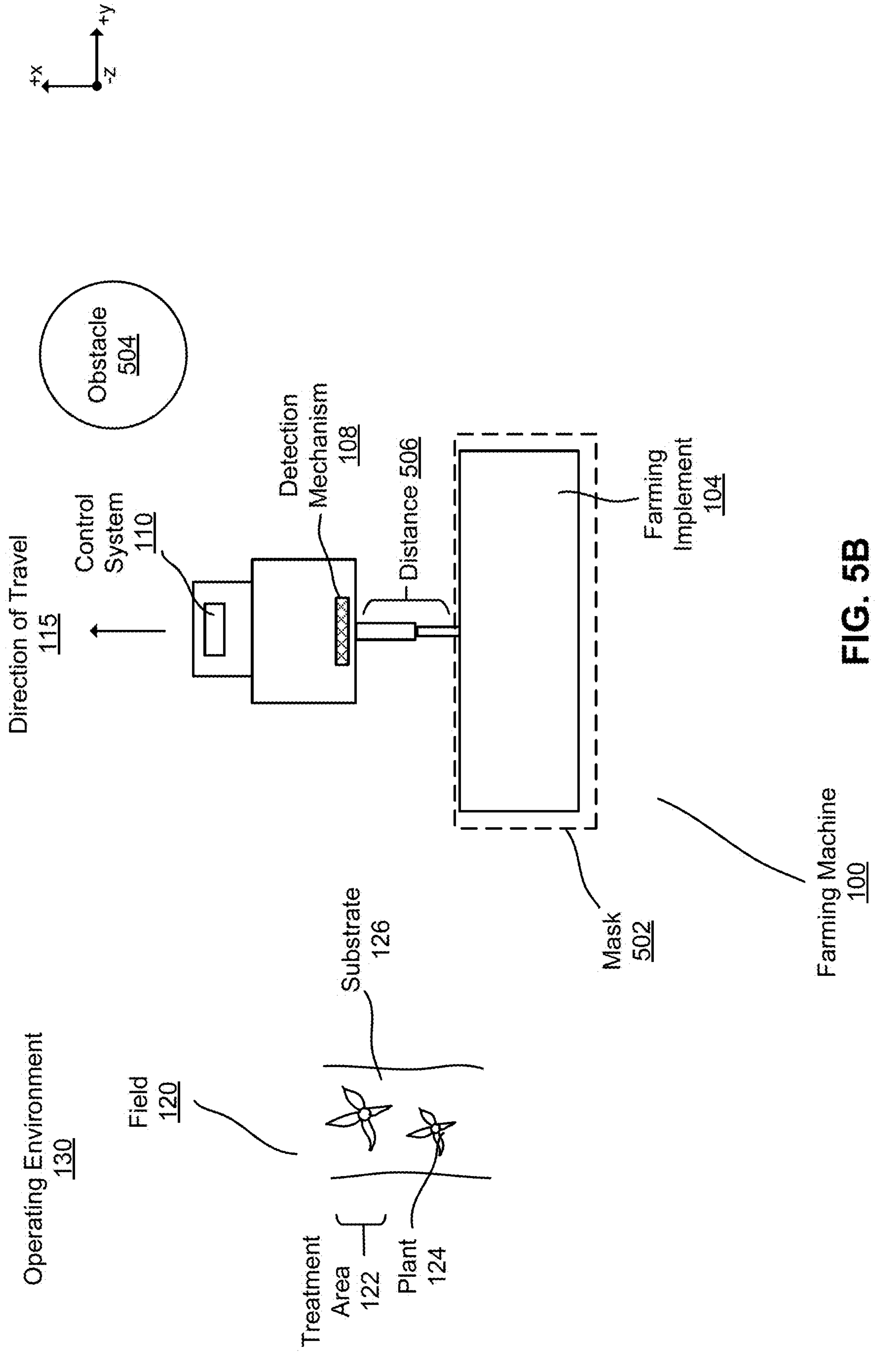
FIG. 5B shows an example mask around a farming implement, in accordance with at least one embodiment.

FIGS. 5A and 5B show example masks around farming implements, in accordance with at least one embodiment. Both FIGS. 5A and 5B show a birds-eye view of the farming machine 100 and the farming implement 104 as the farming machine 100 moves in the direction of travel 115. In FIG. 5A, the farming implement 104 is affixed closely to the farming machine 100 and the detection mechanism 108 is located on the farming implement 104. In FIG. 5B, the farming implement 104 is located at a distance 506 from the body 102 of the farming machine 100 and is freely movable. The farming implement 104 of FIG. 5B may be separatable from the farming implement 104, be an independent farming machine system, or be third-party equipment. In both FIGS. 5A and 5B, as the farming machines 100 move in the direction of travel 115, the detection mechanisms 108 detect objects in their paths. The detection mechanisms 108 detect obstacles 504 ahead of the farming machines 100, however they ignores anything inside the masks 502. For example, the detection mechanism 108 in FIG. 5A ignores the farming implement 104 attached to the body 102, and the detection mechanism 108 in FIG. 5B ignores the freely movable farming implement 104 attached at a distance 506 from the body 102 of the farming machine. Thus, the detection mechanisms 108 do not detect the shapes of the farming implements 104. In response to detecting obstacles 504, the detection mechanisms 108 communicate with the control systems 110, which may pause operation of the farming machines 100, or reroute the farming machines 100 to avoid the obstacles 504. Other farming implements may have different shapes than farming implement 104, and the mask 502 may have a different shape than the one shown in this example. The farming implement 104 may be pushed ahead or towed behind the farming machine 100.

VI. Computer System

Figure 6:
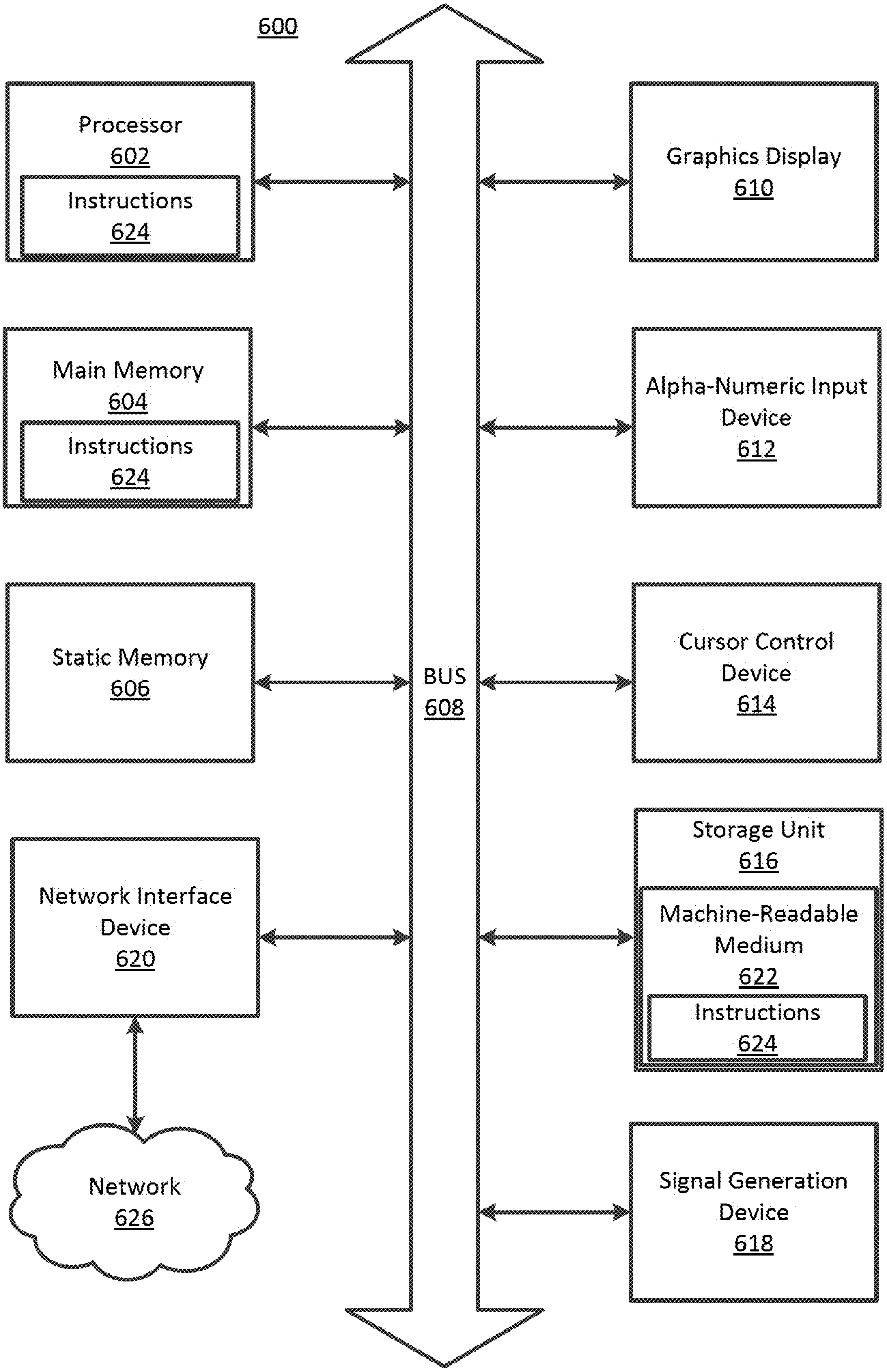
FIG. 6 is a block diagram illustrating components of an example machine for reading and executing instructions from a machine-readable medium, in accordance with at least one embodiment.

FIG. 6 is a block diagram illustrating components of an example machine for reading and executing instructions from a machine-readable medium. Specifically, FIG. 6 shows a diagrammatic representation of control system 110 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the system 110 described in FIG. 2. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 (e.g., network 220) via the network interface device 620.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Furthermore, it has also proven convenient at times, to refer to arrangements of operations as modules, without loss of generality. The described operations and their associated modules may be embodied in software, firmware, hardware, or any combinations thereof.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise. Upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method of generating a mask for a farming implement of an autonomous farming machine, comprising:

accessing a first set of images corresponding to the farming implement of the autonomous farming machine, each image in the first set of images comprising pixels of the farming implement and a surrounding environment;

generating a pixel mask for the farming implement based on the first set of images, the generation comprising:

accessing a digital model of the farming implement present in the first set of images, generating the pixel mask using the digital model of the farming implement, and wherein the pixel mask configured to ignore pixels of the farming implement in images to which the pixel mask is applied;

accessing a second set of images corresponding to the farming implement and the surrounding environment;

generating a masked set of images from the second set of images by applying the pixel mask to the second set of images to ignore the pixels of the farming implement in the second set of images; and performing, using the autonomous farming machine, a farming action based on the masked set of images.

2. The method of claim 1, wherein generating the pixel mask for the farming implement based on the first set of images comprises:

for each image of the first set of images:

identifying pixels of the farming implement in the image, identifying a boundary formed by the identified pixels, and projecting the boundary to a set of GPS locations corresponding to a ground below the farming implement; and generating the pixel mask based on the projected boundaries and pixels identified as the farming implement.

3. The method of claim 1, wherein generating the pixel mask for the farming implement based on the first set of images comprises:

for each image in the first set of images:

identifying pixels of the farming implement in the image, determining a depth for each pixel in the image, and building a point cloud from the identified pixels; and generating the pixel mask by merging the point clouds and determined depths associated with each image.

4. The method of claim 1, wherein one or more fiducial markers are affixed to the farming implement, and wherein generating the pixel mask for the farming implement based on the first set of images comprises:

identifying pixels corresponding to the one or more fiducial markers in the first set of images; and generating the pixel mask for the farming implement based on the identified pixels.

5. The method of claim 1, wherein the first set of images comprises images taken during a calibration routine in which the autonomous farming machines drives in a predetermined route, and wherein generating the pixel mask for the farming implement based on the first set of images comprises:

identifying pixels in the first set of images that do not change between images of the first set of images; and generating the pixel mask based on the identified pixels.

6. The method of claim 1, wherein the first set of images and the second set of images are captured by one or more image sensors affixed to the farming implement.

7. The method of claim 1, wherein the first set of images and the second set of images are captured by one or more image sensors affixed to the autonomous farming machine.

8. The method of claim 7, further comprising:

determining, based on the generated mask, a need for an additional image sensor to increase a field of view of the farming machine; and providing an instruction for a client system to affix an additional image sensor to the autonomous farming machine.

9. The method of claim 1, wherein applying the pixel mask to the second set of images to ignore the pixels of the farming implement in the second set of images comprises applying the pixel mask to the second set of images such that only the pixels of the surround environment remain.

10. The method of claim 1, wherein the farming action includes tilling a field.

11. The method of claim 1, wherein the farming action includes planting in a field.

12. The method of claim 1, wherein the farming action includes applying a treatment to a field.

13. The method of claim 1, wherein generating the pixel mask further comprises:

determining that the images represent a farming implement associated with an existing pixel mask; and accessing the existing pixel mask that represents the farming implement.

14. The method of claim 1, wherein the first set of images is captured in a first pass and the second set of images is captured in a second pass, the first pass before the second pass.

15. The method of claim 1, wherein the first set of images and the second set of images are captured on a same pass.

16. An autonomous farming machine comprising:

one or more processors physically attached to the autonomous farming machine; and a non-transitory computer readable storage medium storing computer program instructions that, when executed by the one or more processors, cause the one or more processors to:

access a first set of images corresponding to a farming implement of the autonomous farming machine, each image in the first set of images comprising pixels of the farming implement and a surrounding environment;

generate a pixel mask for the farming implement based on the first set of images, the generation comprising:

accessing a digital model of the farming implement present in the first set of images, generating the pixel mask using the digital model of the farming implement, and wherein the pixel mask configured to ignore pixels of the farming implement in images to which the pixel mask is applied;

access a second set of images corresponding to the farming implement and the surrounding environment;

generate a masked set of images from the second set of images by applying the pixel mask to the second set of images to ignore the pixels of the farming implement in the second set of images; and perform, using the autonomous farming machine, a farming action based on the masked set of images.

17. The autonomous farming machine of claim 16, wherein the computer program instructions for generating the pixel mask for the farming implement based on the first set of images comprise instructions that cause the one or more processors to:

for each image of the first set of images:

identify pixels of the farming implement in the image, identify a boundary formed by the identified pixels, and project the boundary to a set of GPS locations corresponding to a ground below the farming implement; and generate the pixel mask based on the projected boundaries and pixels identified as the farming implement.

18. The autonomous farming machine of claim 16, wherein the computer program instructions for generating the pixel mask for the farming implement based on the first set of images comprise instructions that cause the one or more processors to:

for each image in the first set of images:

identify pixels of the farming implement in the image, determine a depth for each pixel in the image, and build a point cloud from the identified pixels; and generate the pixel mask by merging the point clouds and determined depths associated with each image.

19. The autonomous farming machine of claim 16, wherein one or more fiducial markers are affixed to the farming implement, and wherein the computer program instructions for generating the pixel mask for the farming implement based on the first set of images comprise instructions that cause the one or more processors to:

identify pixels corresponding to the one or more fiducial markers in the first set of images; and generate the pixel mask for the farming implement based on the identified pixels.

20. A non-transitory computer readable storage medium storing computer program instructions that, when executed by one or more processors, cause the one or more processors to:

access a first set of images corresponding to a farming implement of an autonomous farming machine, each image in the first set of images comprising pixels of the farming implement and a surrounding environment;

generate a pixel mask for the farming implement based on the first set of images, the generation comprising:

accessing a digital model of the farming implement present in the first set of images, generating the pixel mask using the digital model of the farming implement, and wherein the pixel mask configured to ignore pixels of the farming implement in images to which the pixel mask is applied;

access a second set of images corresponding to the farming implement and the surrounding environment;

generate a masked set of images from the second set of images by applying the pixel mask to the second set of images to ignore the pixels of the farming implement in the second set of images; and perform, using the autonomous farming machine, a farming action based on the masked set of images.

* * * * *